(12) United States Patent
Hyde, II et al.

(10) Patent No.: US 7,404,036 B2
(45) Date of Patent: Jul. 22, 2008

(54) REBALANCING OF STRIPED DISK DATA

(75) Inventors: Joseph Smith Hyde, II, Tucson, AZ (US); Bruce McNutt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/286,482

(22) Filed: Nov. 23, 2005

(65) Prior Publication Data

US 2007/0118689 A1 May 24, 2007

(51) Int. Cl.
*G06F 12/02* (2006.01)

(52) U.S. Cl. .............................. 711/114; 711/4; 711/5; 711/154; 711/157

(58) Field of Classification Search ...................... 711/4, 711/5, 114, 154, 157
See application file for complete search history.

(56) References Cited

U.S. PATENT DOCUMENTS

| | | | |
|---|---|---|---|
| 5,502,836 A | 3/1996 | Hale et al. | |
| 5,758,118 A | 5/1998 | Choy et al. | |
| 5,809,224 A | 9/1998 | Schultz et al. | |
| 5,933,834 A | 8/1999 | Aichelen | |
| 6,035,373 A | 3/2000 | Iwata | |
| 6,629,202 B1* | 9/2003 | Cabrera et al. | 711/114 |
| 6,651,154 B1 | 11/2003 | Burton et al. | |
| 6,728,831 B1* | 4/2004 | Bridge | 711/112 |
| 6,862,692 B2* | 3/2005 | Ulrich et al. | 714/6 |
| 2002/0124137 A1* | 9/2002 | Ulrich et al. | 711/113 |
| 2002/0156973 A1* | 10/2002 | Ulrich et al. | 711/114 |
| 2003/0046497 A1* | 3/2003 | Dandrea | 711/154 |
| 2003/0065883 A1* | 4/2003 | Bachmat | 711/114 |
| 2003/0093619 A1* | 5/2003 | Sugino et al. | 711/114 |
| 2005/0144511 A1* | 6/2005 | Chih | 714/5 |

OTHER PUBLICATIONS

"Storage Virtualization System with Load Balancing for SAN", Grid and Cooperative Computing GCC 2004 Workshops, Lecture Notes on Computer Science vol. 3252, published by Springer-Verlag, Berlin Germany.

* cited by examiner

*Primary Examiner*—Jack A Lane
(74) *Attorney, Agent, or Firm*—Rabindranath Dutta; Konrad Raynes & Victor LLP (57) ABSTRACT

Provided are a method, system, and article of manufacture, where a plurality of extents are stored in a first set of storage units coupled to a controller. A determination is made that a second set of storage units has been coupled to the controller. The plurality of extents are distributed among all storage units included in the first set of storage units and the second set of storage units.

14 Claims, 5 Drawing Sheets

REBALANCING OF STRIPED DISK DATA

BACKGROUND

1. Field

The disclosure relates to a method, system, and article of manufacture for the rebalancing of striped disk data.

2. Background

In computers that are coupled to a plurality of hard disks, data striping, also referred to as disk striping, is the process of dividing a body of data into stripes and spreading the stripes over a plurality of hard disks.

Certain system may perform data striping across Redundant Array of Independent Disk (RAID) ranks, where the RAID ranks are also referred to as RAID arrays. RAID is a storage system that uses a plurality of disks to store and distribute data. To perform data striping, the data belonging to a certain logical unit (LUN) may be divided into extents. Successive extents of a volume may then be distributed in a rotating manner across the available RAID ranks. Such striping may allow for the balancing of Input/Output (I/O) load.

The balancing of I/O load across RAID ranks may be lost if new ranks are added to the set across which data striping has already been performed.

SUMMARY OF THE DESCRIBED EMBODIMENTS

Provided are a method, system, and article of manufacture, wherein a plurality of extents are stored in a first set of storage units coupled to a controller. A determination is made that a second set of storage units has been coupled to the controller. The plurality of extents are distributed among all storage units included in the first set of storage units and the second set of storage units.

In certain additional embodiments, the storage units are Redundant Array of Disk (RAID) arrays, wherein the plurality of extents are distributed equally among all the RAID arrays included in the first set of RAID arrays and the second set of RAID arrays, wherein no extent is moved more than once while distributing the plurality of extents among all the RAID arrays, and wherein the plurality of extents are distributed among all the RAID arrays with a minimal number of moves, and wherein the plurality of extents span a volume.

In yet additional embodiments, the first set of storage units comprise a number of pre-existing RAID arrays, wherein the second set of storage units comprise newly added RAID arrays that are empty, and wherein the pre-existing and the newly added RAID arrays together comprise a total number of RAID arrays. A determination is made of a result by multiplying the number of pre-existing RAID arrays with the total number of RAID arrays. A quotient is determined by dividing the number of the plurality of extents by the result. Groups equal in number to the quotient are generated, wherein each group is assigned extents equal in number to the result. One group is processed, by redistributing the extents assigned to the one group equally among the total number of RAID arrays.

In further embodiments, the plurality of extents are a first plurality of extents, wherein the first and the second set of storage units together comprise a total number of storage units. A second plurality of extents are stored in the second set of storage units, wherein the first and the second plurality of extents comprise a total number of extents. A result is determined by squaring the total number of storage units. A quotient is determined by dividing the total number of extents by the result. Groups equal in number to the quotient are generated, wherein each group is assigned extents equal in number to the result, and wherein each group includes selected extents from the first and the second set of storage units. One group is processed, by redistributing the extents assigned to the one group equally among the total number of storage units.

In yet further embodiments, the first and the second set of storage units together comprise a total number of storage units. A determination is made of the least common multiple of the number of storage units in the first set of storage units and the total number of storage units. Groups of storage units are generated, wherein each group is assigned the least common multiple number of extents selected from the plurality of extents. One group is processed, by redistributing the assigned extents of the one group equally among the total number of storage units, wherein the redistributing is based on performing a minimum number of copy operations from the first to the second set of storage units.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. For example, the proposed embodiments can be applied regardless of the type of application data being stored in the storage devices.

Certain embodiments provide for the rebalancing of striped disk data, in response to new ranks being added to the set of disks across which data striping has already been performed. In certain embodiments, logical volumes are striped across an extent pool (with a "strip" size of one extent). Certain embodiments may allow rebalancing of the volume striping pattern after adding one or more new ranks to the pool. In certain embodiments each volume is striped across all of the ranks in the pool, while moving as little data as possible, and without introducing any requirement for temporary disk storage of the data being moved.

In certain embodiments, the extents of each existing volume are organized into sets of size M, where M is the product of the new and the old number of ranks. Specific extents selected from this group are then moved into the new ranks, in such a way that the distribution of extents is balanced across the new set of ranks.

In certain other embodiments, a certain number of new volumes may have already been allocated to the new ranks before rebalancing operations are performed. In such a case, groups are formed of a size equal to the square of the new number of ranks, with each group including extents from one old and one new volume. Selected extents are then swapped with each other, in such a way that the distribution of the extents from each volume is striped across the new set of ranks.

Figure 1:
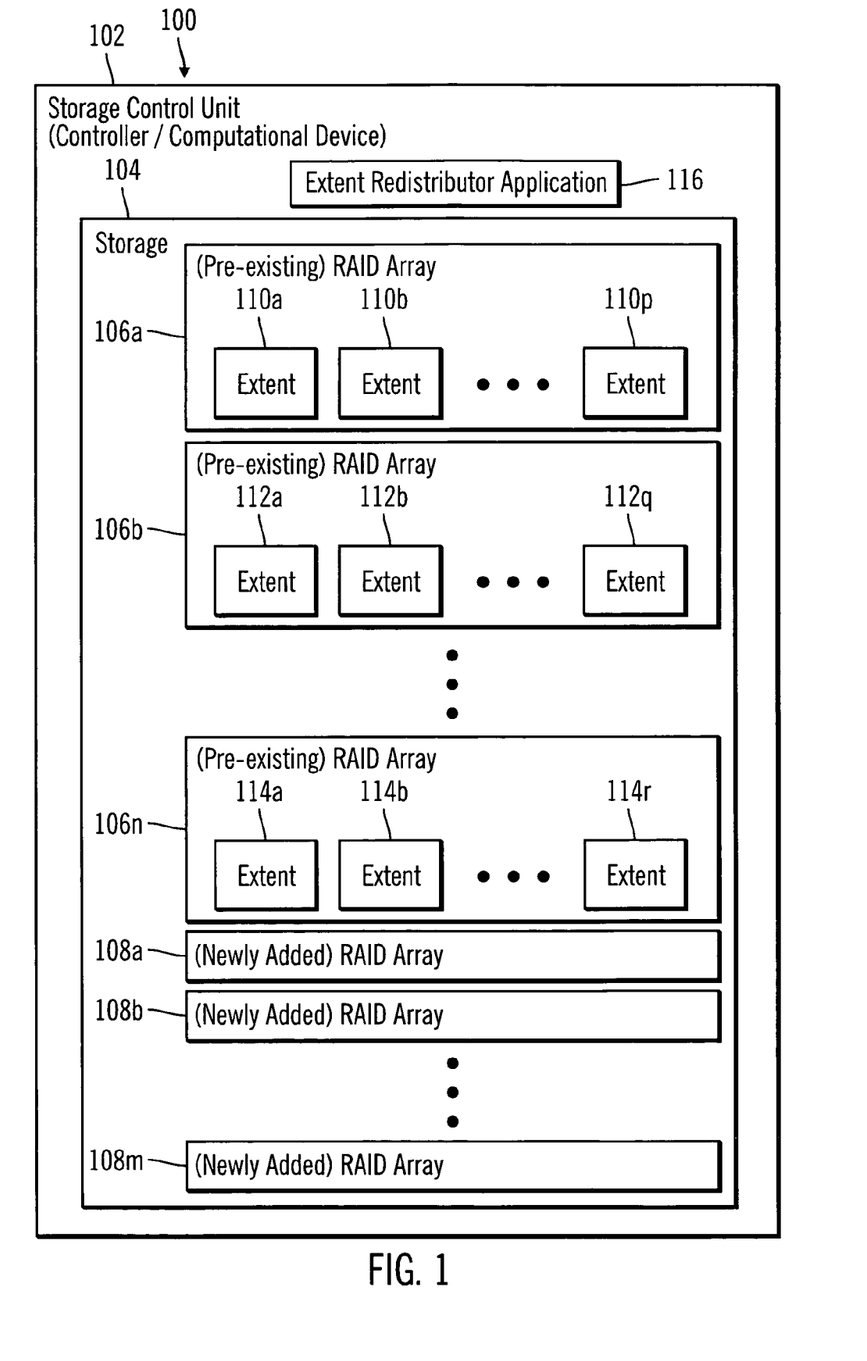
FIG. 1 illustrates a block diagram of a computing environment that includes a storage control unit with pre-existing and newly added RAID arrays, in accordance with certain embodiments.

FIG. 1 illustrates a block diagram of a computing environment 100 that includes a storage control unit 102 that is coupled to a storage 104 that includes pre-existing RAID arrays 106a, 106b, . . . 106n and newly added RAID arrays 108a, 108b, . . . 108m, in accordance with certain embodiments. The newly added RAID arrays 108a . . . 108m are coupled to the storage control unit 102, after the storage control unit 102 has already stored data in the previously coupled pre-existing RAID arrays 106a . . . 106n.

The storage control unit 102, also referred to as a controller, comprises any suitable computational device, including those presently known in the art, such as personal computers, workstations, mainframes, midrange computers, network appliances, palm top computers, telephony devices, blade computers, hand held computers, etc.

While FIG. 1 illustrates the storage 104 with pre-existing RAID arrays 106a . . . 106n, and newly added RAID arrays 108a . . . 108m, in alternative embodiments the storage 104 may include storage devices that are different from RAID arrays. For example, instead of or in addition to the RAID arrays 106a . . . 106n, 108a . . . 108m, the storage 104 may include tapes, optical devices, etc.

Extents 110a, 110b, . . . 110p, 112a, 112b, . . . 112q, 114a, 114b, . . . 114r are distributed among the pre-existing RAID arrays 106a . . . 106n. An extent is an element that stores data, where the size of each extent is the same. The size of an extent may vary and may for example be 5 Kbytes in one embodiment, 50 Kbytes in another embodiment, and 1 Mbyte in yet another embodiment. The size of the each extent is small in comparison to the storage capacity of each RAID array. A plurality of extents may belong to the same volume that is being written to the storage 104. While no extents have been shown in the newly added RAID arrays 108a . . . 108m, extents may be copied or written into the pre-existing RAID arrays 108a . . . 108m.

The storage control unit 102 includes an extent redistributor application 116, where the extent redistributor application 116 is capable of rearranging the extents 110a . . . 110p, 112a . . . 112q, 114a . . . 114r among the RAID arrays 106a . . . 106n, 108a . . . 108m.

In certain embodiments, the extent redistributor application 116 organizes extents among the pre-existing RAID arrays 106a . . . 106n and the newly added RAID arrays 108a . . . 108m, such that the distribution of extents is balanced across the pre-existing RAID arrays 106a . . . 106n and the newly added RAID arrays 108a . . . 108m.

Figure 2:
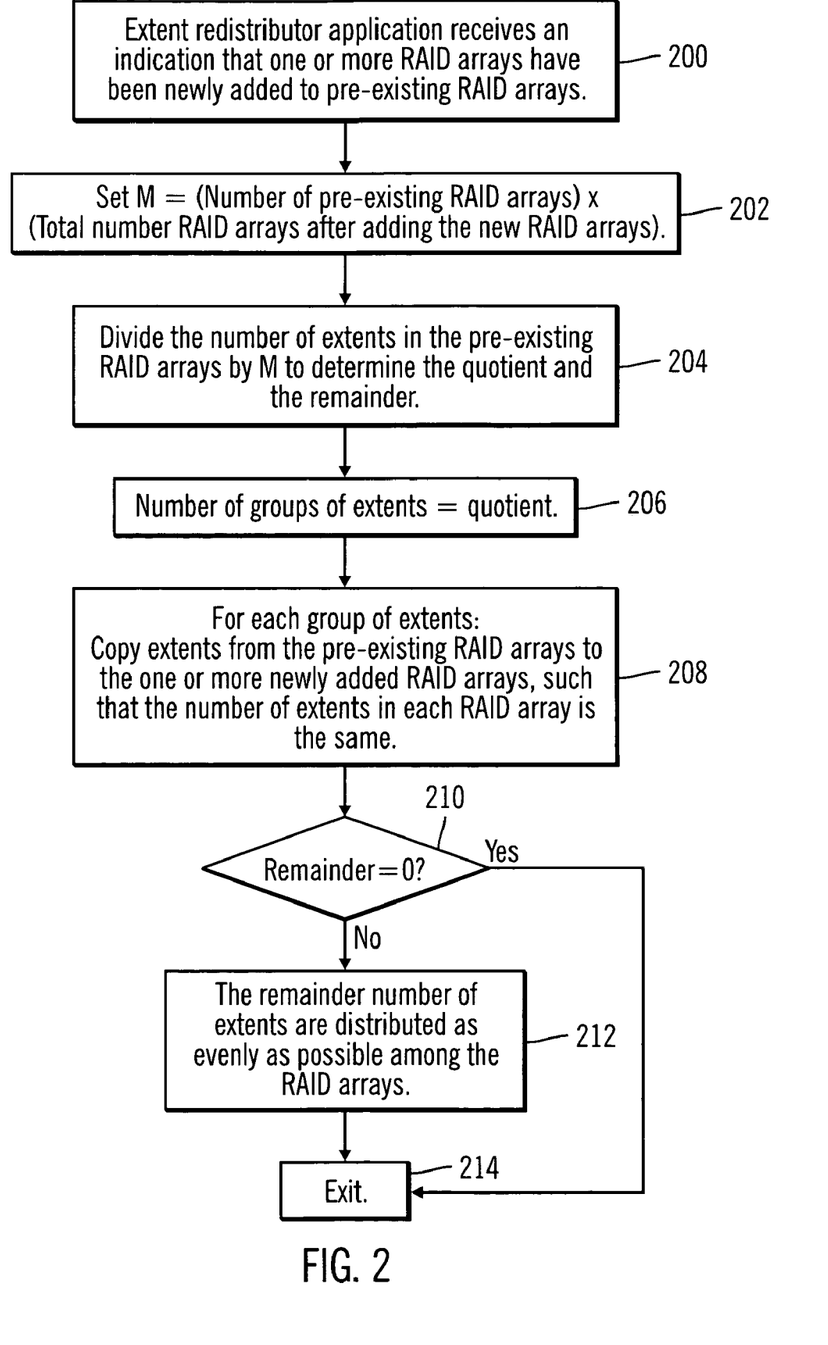
FIG. 2 illustrates a flowchart for rebalancing extents across all RAID arrays when the newly added RAID arrays are empty, in accordance with certain embodiments.

FIG. 2 illustrates a flowchart for rebalancing extents across all RAID arrays in the computing environment 100 of FIG. 1 when the newly added RAID arrays 108a . . . 108m are empty, in accordance with certain embodiments. Certain operations illustrated in FIG. 2 may be implemented in the extent redistributor application 116.

The following illustrates certain embodiments, certain aspects of which will be shown later in the flowchart of FIG. 2. Suppose that an extent pool initially contains ranks 0 and 1, where a rank is a RAID array. Thus, a given volume V might have the extents of the volume V assigned in the order $\{0, 1, 0, 1, \ldots\}$ to the two ranks. Subsequently, a third rank may be added, where the third rank is referred to as rank 2. In order to rebalance, certain embodiments organize the extents of the volume V into groups of $2 \times 3 = 6$. Each group (say group g) of 6 extents will include 3 members in rank 0, and 3 members in rank 1.

For reference, let the three members in rank 0 be called $g_{0,0}$, $g_{0,1}$, and $g_{0,2}$. Similarly, the three members in rank 1 may be called $g_{1,0}$, $g_{1,1}$, and $g_{1,2}$.

Certain embodiments assign the group of six extents to the three new ranks as follows:
Rank 0: extent $g_{0,0}$, extent $g_{0,1}$
Rank 1: extent $g_{1,0}$, extent $g_{1,1}$
Rank 2: extents $g_{0,2}$, extent $g_{1,2}$ Such embodiments avoid making any copies of data except into rank 2.

More specifically in a first approach, in certain embodiments an expansion is needed for the number of ranks in an extent pool from $N_{old}$ to $N_{new}$. Certain embodiments, proceed by forming the existing extents of a volume into groups of size $M=N_{old} \times N_{new}$. Each group includes $N_{new}$ occurrences of each old rank.

A given group may be built up by separately identifying the extents that belong to each old rank. This can be done by proceeding through the volume extents in Relative Byte Address (RBA) order, keeping a pointer to the most recently added extent belonging to every rank. One extent is added to the first rank, by proceeding forward with the first rank's pointer; then one extent is added to the next rank, by proceeding forward with the next rank's pointer; and so forth, until $N_{new}$ extents have been found belonging to each rank. Such embodiments for building the groups avoid making assumptions about the existing pattern of extent assignments.

Any extents that may be left over, after generating as many evenly balanced groups as possible, are deferred until the end. A second attempt is then made to form the extents that are left over into groups, this time relaxing the requirement to use just one volume in a given group.

If any extents are still left over, after forming this second set of groups, such extents are ignored. Let the extents in a given group g, included in rank 0, be numbered $g_{0,0}, g_{0,1}, \ldots, g_{0,N_{new}-1}$ and the extents in ranks 1, 2, . . . , $N_{old-1}$ may also be numbered in a corresponding manner. The rebalancing operation can then be performed as follows:

```
for i = N_old to N_new - 1; for j = 0 to N_old - 1;
    allocate the new extent f_{i,j};
for i = 0 to N_old - 1; for j = N_old to N_new - 1;
    move g_{i,j} to f_{j,i};
    free extent g_{i,j};
```

The number of extents copied is the minimum needed to ensure that each rank contains an equal number of extents from the volume.

Proceeding now to the flowchart of FIG. 2, which illustrates certain aspects of the embodiments for rebalancing striped disk data as implemented in the computing environment 100, control starts at control starts at block 200 where the extent redistributor application 116 receives an indication that one or more RAID arrays 108a . . . 108m have been newly added to pre-existing RAID arrays 106a . . . 106n.

The extent redistributor application 116 sets (at block 202) M to equal the product of the number of the number of pre-existing RAID arrays 106a . . . 106n and the total number RAID arrays after adding the new RAID arrays 108a . . . 108m.

The extent redistributor application 116 divides (at block 204) the number of extents in the pre-existing RAID arrays 106a . . . 106n by M to determine the quotient and the remainder. The number of groups of extents is assigned (at block 206) to the quotient.

Subsequently, for each group of extents the extent redistributor application 116 copies (at block 208) extents from the pre-existing RAID arrays 106a . . . 106n to the one or more newly added RAID arrays 108a . . . 108m, such that the number of extents in each RAID array is the same.

Control proceeds to block 210, where the extent redistributor application 116 determines whether the remainder is zero. If so, control proceeds to block 214 and the process of rebalancing terminates. If not, the remainder number of extents are distributed (at block 212) as evenly as possible among the RAID arrays 106a . . . 106n, 108a . . . 108m, and control proceeds to block 214 where the process of rebalancing terminates.

Therefore, FIG. 2 illustrates certain embodiments in which no extents have been allocated to the newly added RAID arrays 108a . . . 108m prior to the process of rebalancing the extents within the pre-existing RAID arrays 106a . . . 106n and the newly added RAID arrays 108a . . . 108m. Certain embodiments ensure that the number of extents copied is the minimum needed to ensure that each RAID rank contains an equal number of extents from a volume that comprises the extents.

Figure 3:
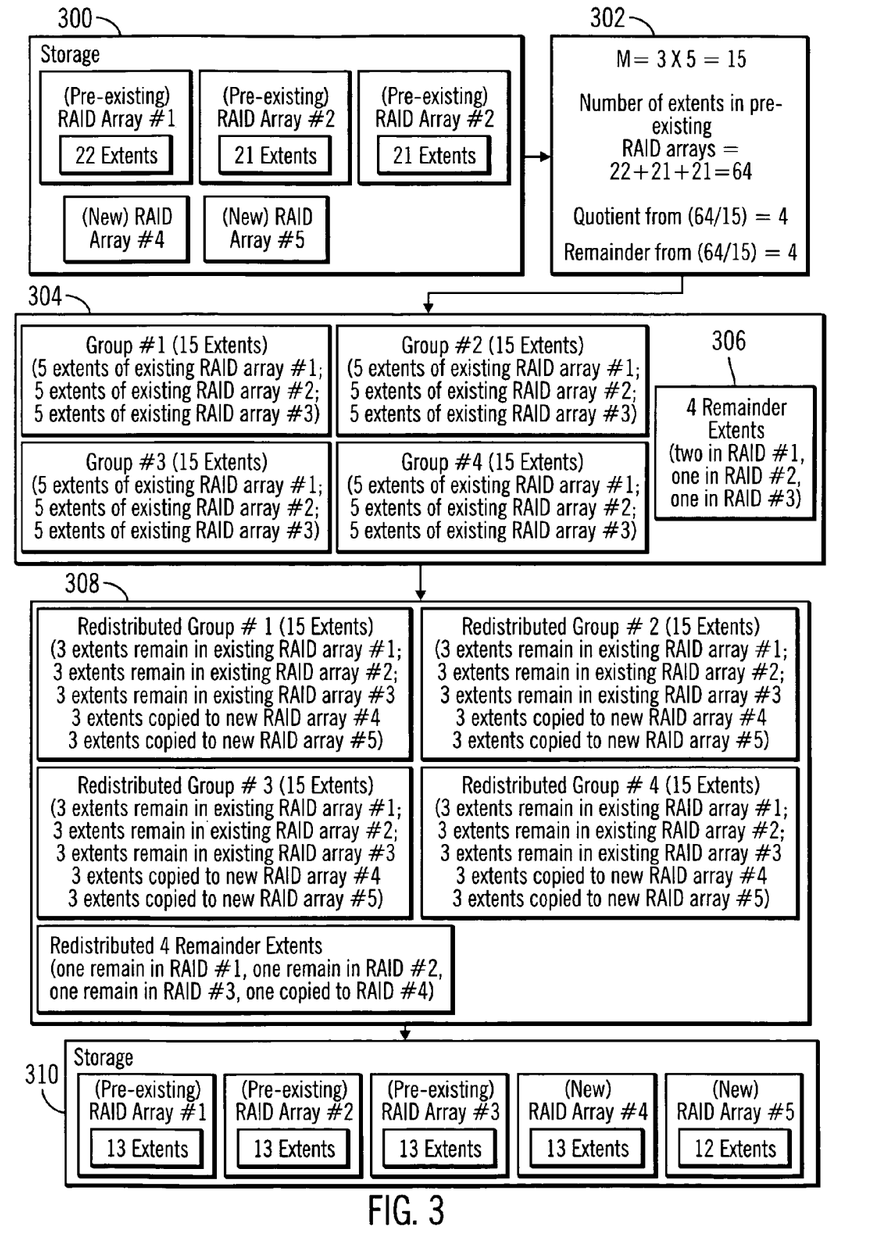
FIG. 3 illustrates an example that shows the rebalancing of extents across all RAID arrays when the newly added RAID arrays are empty, in accordance with certain embodiments.

FIG. 3 illustrates an example that shows the rebalancing of extents across all RAID arrays when the newly added RAID arrays are empty, in accordance with certain embodiments.

In FIG. 3 the storage 300 includes three pre-existing RAID arrays and two newly added RAID arrays. Block 302 of FIG. 3 illustrates how M, quotient, and remainder are calculated in accordance with the logic of block 202 and 204 of FIG. 2.

Since M is calculated to be 15 and the quotient is 4, block 304 shows four groups being formed where each of the four groups have 15 extents. In addition to the four groups, four remainder extents 306 are shown in block 304.

Block 308 illustrates how the extents of the four groups are redistributed among the five RAID arrays, and how the four remainder extents 306 are distributed among the five RAID arrays. The logic illustrated in blocks 206-214 of FIG. 2 may be used to redistribute the extents.

Block 310 illustrates the number of extents in each of the five RAID arrays after rebalancing. After rebalancing each of the RAID arrays have the extents distributed as evenly as possible.

Therefore, FIG. 3 illustrates an example for rebalancing extents across RAID arrays in accordance with the logic described in FIG. 2.

Figure 4:
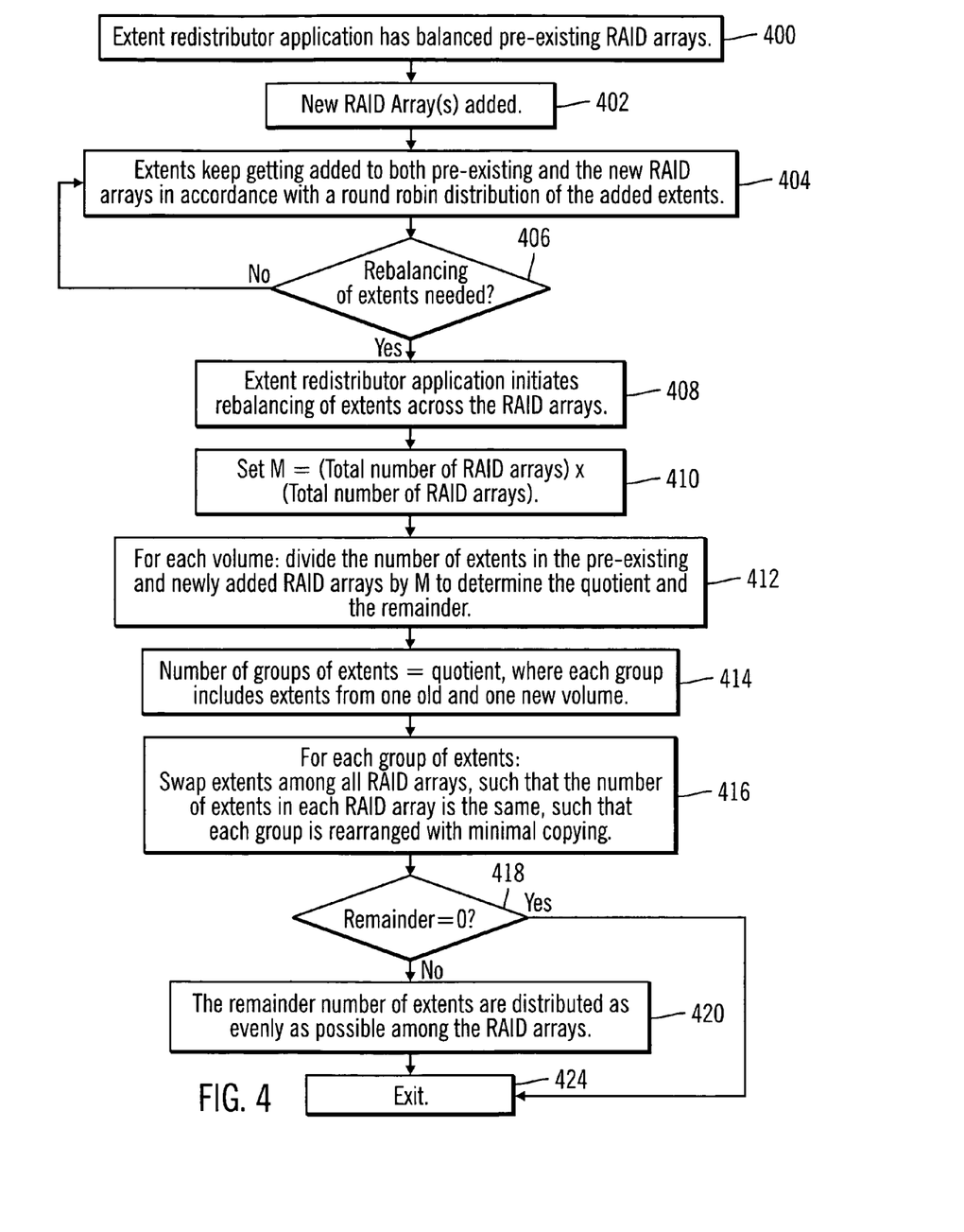
FIG. 4 illustrates a flowchart for rebalancing extents across all RAID arrays when extents have been stored in the newly added RAID arrays, in accordance with certain embodiments.

FIG. 4 illustrates a flowchart for rebalancing extents across all RAID arrays when extents have been stored in the newly added RAID arrays 108a . . . 108m, in accordance with certain embodiments. Certain operations described in FIG. 4 may be implemented in the extent redistributor application 116 implemented in the storage control unit 102.

The following illustrates certain embodiments according to a second approach, certain aspects of which will be shown in the flowchart of FIG. 4. The exemplary steps 1, 2, and 3 (provided below) as implemented in certain embodiments, allow allocations to occur in the newly added RAID arrays 108a . . . 108m prior to rebalancing:

Step 1: For each volume, form as many groups as possible that have exactly one occurrence of each of the $N_{new}$ target ranks. The extents identified in this way are left alone.

Step 2: Form as many groups as possible that have $N_{new}$ occurrences of each old rank (labeled $g_{i,j}$) on one volume, and $N_{new}$ occurrences of each added rank (labeled $h_{i,j}$) on a different volume. Each such group can be rearranged in place with minimum copying. To accomplish the rearrangement with minimum copying, the following set of pairwise extent swaps may be performed:

for i = 0 to $N_{old}$ − 1; for j = $N_{old}$ to $N_{new}$ − 1;
swap $g_{i,j}$ with $h_{j,i}$;

Step 3: For each volume, form as many groups as possible of the same type as those just described in the first approach described earlier, and handle the groups in the same way as described earlier for the first approach.

As in the first approach, the handling of left over extents in the extended version is deferred until the end. As many such extents as possible are handled as in Step (1), but this time relaxing the requirement for all members of a group to belong to the same volume. Any remaining extents are then handled as are the deferred extents in the first approach.

Proceeding now to the flowchart of FIG. 4, which illustrates certain aspects of the embodiments for rebalancing striped disk data as implemented in the computing environment 100, control starts at control starts at block 400 where the extent redistributor application 116 has balanced the pre-existing RAID arrays 106a . . . 106n.

Control proceeds to block 402, where new RAID arrays 108a . . . 108m are added to the pre-existing RAID arrays 106a . . . 106n. Extents keep getting added (at block 404) to both pre-existing RAID arrays 106a . . . 106n and the new RAID arrays 108a . . . 108m in accordance with a round robin distribution of the added extents.

The extent redistributor application 116 determines (at block 406) whether a rebalancing of the extents is needed. If not, control returns to block 404, whereas if a rebalancing of extents is needed the extent redistributor application 116 initiates (at block 408) the rebalancing of extents across the RAID arrays.

In certain embodiment, the extent distributor application 116 sets (at block 410) M to be the square of the total number of RAID arrays. Then at block 412, for each volume, the extent redistributor application 116 divides the number of extents in the pre-existing 106a . . . 106n and the newly added RAID arrays 108a . . . 108m by M to determine the quotient and the remainder. Control proceeds to block 414, where the number of groups of exents is assigned to the value of the quotient, where in certain embodiments each group includes extents from one old and one new volume.

The extent redistributor application 116 swaps (at block 416) extents among all RAID arrays for each group of extents, such that the number of extents in each RAID array is the same, where in certain embodiments each group is rearranged with minimal copying Control proceeds to block 418, where the extent redistributor application 116 determines whether the remainder is zero. If so, control proceeds to block 424 and the process of rebalancing terminates. If not, the remainder number of extents are distributed (at block 420) as evenly as possible among the RAID arrays 106a . . . 106n, 108a . . . 108m, and control proceeds to block 424 where the process of rebalancing terminates.

Therefore, FIG. 4 illustrates certain embodiments, where the extents are rebalanced after a certain number of extents have been stored in the newly added RAID arrays 108a . . . 108m.

FIGS. 1-4 illustrate certain embodiments for rebalancing extents, where in some embodiments operations for rebalancing are performed immediately following the addition of the new ranks, while the ranks are still empty. In certain other embodiments, volume allocations may have occurred prior to performing the operations for rebalancing.

In certain alternative embodiments, a determination is made of the least common multiple of the number of storage units, e.g., RAID arrays, in the pre-existing set of storage units and the total number of storage units. Groups of storage units are generated, wherein each group is assigned the least common multiple number of extents selected from the plurality of extents. One group is processed, by redistributing the assigned extents of the one group equally among the total number of storage units, wherein the redistributing is based on performing a minimum number of copy operations from the first to the second set of storage units.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
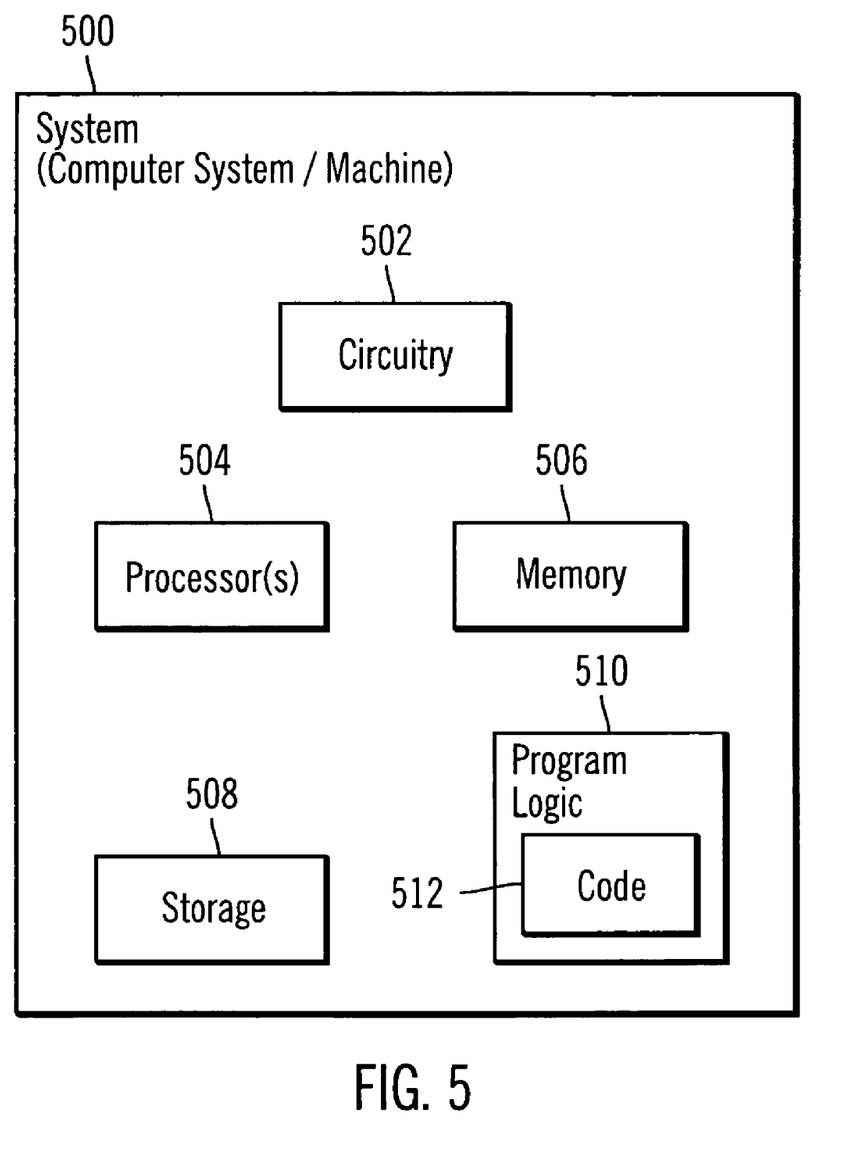
FIG. 5 illustrates the architecture of computing system, wherein in certain embodiments the storage control unit of the computing environment of FIG. 1 may be implemented in accordance with the architecture of the computing system.

FIG. 5 illustrates an exemplary computer system 500, wherein in certain embodiments the storage control unit 102 of the computing environment 100 of FIG. 1 may be implemented in accordance with the computer architecture of the computer system 500. The computer system 500 may also be referred to as a system, and may include a circuitry 502 that may in certain embodiments include a processor 504. The system 500 may also include a memory 506 (e.g., a volatile memory device), and storage 508. Certain elements of the system 500 may or may not be found in the storage control unit 102. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 2 and 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   storing a plurality of extents in a first set of storage units coupled to a controller;
   determining that a second set of storage units has been coupled to the controller; and
   distributing the plurality of extents among all storage units included in the first set of storage units and the second set of storage units, wherein no extent is moved more than once while distributing the plurality of extents among all the storage units.

2. The method of claim 1, wherein the first set of storage units comprise a number of pre-existing RAID arrays, wherein the second set of storage units comprise newly added RAID arrays that are empty, and wherein the pre-existing and the newly added RAID arrays together comprise a total number of RAID arrays, the method further comprising:
   determining a result by multiplying the number of pre-existing RAID arrays with the total number of RAID arrays;
   determining a quotient by dividing the number of the plurality of extents by the result;
   generating groups equal in number to the quotient, wherein each group is assigned extents equal in number to the result; and
   processing one group, by redistributing the extents assigned to the one group equally among the total number of RAID arrays.

3. The method of claim 1, wherein the plurality of extents are a first plurality of extents, wherein the first and the second set of storage units together comprise a total number of storage units, the method further comprising:
   storing a second plurality of extents in the second set of storage units, wherein the first and the second plurality of extents comprise a total number of extents;
   determining a result by squaring the total number of storage units;
   determining a quotient by dividing the total number of extents by the result;
   generating groups equal in number to the quotient, wherein each group is assigned extents equal in number to the result, and wherein each group includes selected extents from the first and the second set of storage units; and
   processing one group, by redistributing the extents assigned to the one group equally among the total number of storage units.

4. The method of claim 1, wherein the first and the second set of storage units together comprise a total number of storage units, wherein the method further comprises:
   determining the least common multiple of the number of storage units in the first set of storage units and the total number of storage units;
   generating groups of storage units, wherein each group is assigned the least common multiple number of extents selected from the plurality of extents;
   processing one group, by redistributing the assigned extents of the one group equally among the total number of storage units, wherein the redistributing is based on performing a minimum number of copy operations from the first to the second set of storage units.

5. The method of claim 1, wherein the plurality of extents are distributed among all the storage units included in the first set of storage units and the second set of storage units with a minimal number of moves.

6. The method of claim 1, wherein the plurality of extents are distributed equally among all the storage units included in the first set of storage units and the second set of storage units.

7. A method, comprising:
   storing a plurality of extents in a first set of storage units coupled to a controller;
   determining that a second set of storage units has been coupled to the controller; and
   distributing the plurality of extents among all storage units included in the first set of storage units and the second set of storage units, wherein the storage units are Redundant Array of Independent Disk (RAID) arrays, wherein the plurality of extents are distributed equally among all the RAID arrays included in the first set of RAID arrays and the second set of RAID arrays, wherein no extent is moved more than once while distributing the plurality of extents among all the RAID arrays, and wherein the plurality of extents are distributed among all the RAID arrays with a minimal number of moves, and wherein the plurality of extents span a volume.

8. A method for deploying computing infrastructure, comprising integrating computer-readable code into a computing system, wherein the code in combination with the computing system is capable of performing:

storing a plurality of extents in a first set of storage units coupled to the computing system;
   determining that a second set of storage units has been coupled to the computing system; and
   distributing the plurality of extents among all storage units included in the first set of storage units and the second set of storage units, wherein no extent is moved more than once while distributing the plurality of extents among all the storage units.

9. The method for deploying computing infrastructure of claim 8, wherein the first set of storage units comprise a number of pre-existing RAID arrays, wherein the second set of storage units comprise newly added RAID arrays that are empty, and wherein the pre-existing and the newly added RAID arrays together comprise a total number of RAID arrays, the method further comprising:
   determining a result by multiplying the number of pre-existing RAID arrays with the total number of RAID arrays;
   determining a quotient by dividing the number of the plurality of extents by the result;
   generating groups equal in number to the quotient, wherein each group is assigned extents equal in number to the result; and
   processing one group, by redistributing the extents assigned to the one group equally among the total number of RAID arrays.

10. The method for deploying computing infrastructure of claim 8, wherein the plurality of extents are a first plurality of extents, wherein the first and the second set of storage units together comprise a total number of storage units, the method further comprising:
   storing a second plurality of extents in the second set of storage units, wherein the first and the second plurality of extents comprise a total number of extents;
   determining a result by squaring the total number of storage units;
   determining a quotient by dividing the total number of extents by the result;
   generating groups equal in number to the quotient, wherein each group is assigned extents equal in number to the result, and wherein each group includes selected extents from the first and the second set of storage units; and
   processing one group, by redistributing the extents assigned to the one group equally among the total number of storage units.

11. The method for deploying computing infrastructure of claim 8, wherein the first and the second set of storage units together comprise a total number of storage units, wherein the method further comprises:
   determining the least common multiple of the number of storage units in the first set of storage units and the total number of storage units;
   generating groups of storage units, wherein each group is assigned the least common multiple number of extents selected from the plurality of extents;
   processing one group, by redistributing the assigned extents of the one group equally among the total number of storage units, wherein the redistributing is based on performing a minimum number of copy operations from the first to the second set of storage units.

12. The method for deploying computing infrastructure of claim 8, wherein the plurality of extents are distributed among all the storage units included in the first set of storage units and the second set of storage units with a minimal number of moves.

13. The method for deploying computing infrastructure of claim 8, wherein the plurality of extents are distributed equally among all the storage units included in the first set of storage units and the second set of storage units.

14. A method for deploying computing infrastructure, comprising integrating computer-readable code into a computing system, wherein the code in combination with the computing system is capable of performing:
   storing a plurality of extents in a first set of storage units coupled to the computing system;
   determining that a second set of storage units has been coupled to the computing system; and
   distributing the plurality of extents among all storage units included in the first set of storage units and the second set of storage units, wherein the storage units are Redundant Array of Independent Disk (RAID) arrays, wherein the plurality of extents are distributed equally among all the RAID arrays included in the first set of RAID arrays and the second set of RAID arrays, wherein no extent is moved more than once while distributing the plurality of extents among all the RAID arrays, and wherein the plurality of extents are distributed among all the RAID arrays with a minimal number of moves, and wherein the plurality of extents span a volume.

* * * * *